United States Patent Office 3,264,302
Patented August 2, 1966

1

3,264,302
PSEUDORESERPIC ACID DERIVATIVES
Johannes Mueller, Arlesheim, Switzerland, assignor to Ciba Corporation, New York, N.Y., a corporation of Delaware
No Drawing. Filed Aug. 23, 1963, Ser. No. 304,205
Claims priority, application Switzerland, Aug. 28, 1962, 10,170/62; July 12, 1963, 8,733/63
12 Claims. (Cl. 260—287)

The present invention provides a new process for the manufacture of 17α-hydroxy-18β-acyloxy-20α-yohimbane-16β-carboxylic acid esters, their N-oxides and the salts of these compounds.

The afore-mentioned products of the present process, including, for example, the naturally occurring substances pseudoreserpine and raunescine, have not been accessible synthetically up to now. The only possible method was to extract pseudoreserpine and raunescine in a cumbersome manner from Rauwolfia plants and the yields were very small.

The present invention is based on the observation that the 17α-hydroxy-18β-acyloxy-20α-yohimbane-16β-carboxylic acid esters, their N-oxides or the salts of these compounds are obtained when in a 16:18-lactone of a 17α-18β-dihydroxy-20α-yohimbane-16β-carboxylic acid, or in an N-oxide thereof or in a salt of these compounds the 17-hydroxyl group is protected, e.g., substituted, for example, etherified or esterified with a residue that is difficult to eliminate by alkaline hydrolysis but easy to eliminate by hydrogenolysis or acid hydrolysis, the resulting lactone is split with an alkaline agent, any resulting compound containing a free carboxyl group in position 16 is esterified, the hydroxyl group in position 18 is acylated and in the resulting compound the ether or ester residue at the oxygen atom in position 17 is eliminated by hydrogenolysis or acid hydrolysis and, if desired, a product obtained at any stage of the process is isomerized in position 3.

In the 16:18-lactones of the 17α:18β-di-hydroxy-20α-yohimbane-16β-carboxylic acids to be used in the present process, in their N-oxides or salts the 3-hydrogen atom may be in the α-position or β-position.

The afore-mentioned lactones contain the nucleus of the formula

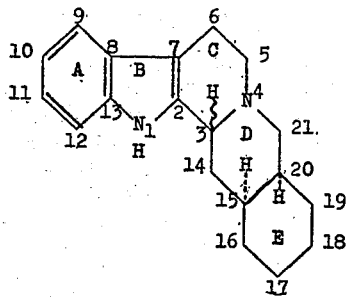

These lactones may contain further substituents, for example aliphatic hydrocarbon residues, etherified or esterified hydroxyl groups, etherified mercapto groups, nitro or amino groups, halogen atoms and/or halogeno-lower alkyl groups. These substituents are particularly suitable for the positions 9 to 12 of the aromatic ring

2

A, whereas for position 5 or 6 the heterocycle C aliphatic hydrocarbon residues are particularly useful.

Particularly suitable starting materials are those of the formula

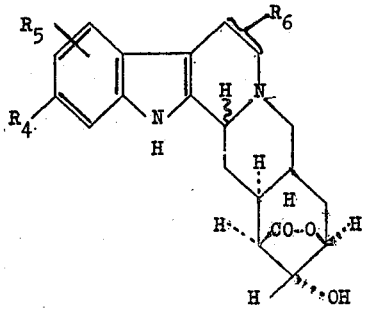

in which $R_4$ and $R_5$ each represents a hydrogen atom, a hydroxyl group, a lower alkoxy, lower alkyl, lower alkylmercapto group, an aralkoxy group, amino group, mono- or di-lower alkyl-amino group or a halogen atom, or $R_4+R_5$ in vicinal positions may form a methylenedioxy group, and $R_6$ in position 5 or 6 represents hydrogen or a lower alkyl radical, as well as their N-oxides or salts of these compounds.

Lower alkyl groups are more especially methyl, ethyl, propyl or butyl groups.

Lower alkoxy, alkylmercapto, mono- or di-lower alkyl-amino groups are especially those in which the alkyl radicals are the afore-mentioned lower alkyls.

A radical that is difficult to eliminate by alkaline hydrolysis but easy to eliminate by hydrogenolysis is, for example, a benzyl radical or a carbo-benzoxy radical. These radicals may be substituted, for example as shown above for $R_4$ and $R_5$.

The etherification or esterification is carried out by known methods.

A radical that is difficult to eliminate by alkaline hydrolysis but easy to eliminate by acid hydrolysis is, for example, an oxa- or thia-cycloalkyl-(2) radical made up of at least 5 members. These oxa cycloalkyl or thia-cycloalkyl radicals contain preferably 4 to 6 cyclic carbon atoms. The carbon atoms of the oxa-cycloalkyl or thia-cycloalkyl radical may be unsubstituted or substituted by hydrocarbon radicals, for example by lower alkyls such as those mentioned above, by cycloalkyl groups such as cyclopentyl or cyclohexyl, by aryls such as phenyl groups, by aralkyls such as phenyl-lower alkyl groups, for example benzyl, or by halogen atoms. The aromatic nuclei of the said radicals may contain further substituents, for example those mentioned above in connection with $R_4$ and $R_5$. The oxa-cycloalkyl or thia-cycloalkyl radical may also contain a fused ring, such as a cycloalkyl ring or a benzene ring, and this ring may be substituted, for example by the substituents mentioned above for $R_4$ and $R_5$.

The oxa- or thia-cycloalkyl-(2)radical is, for example, a tetrahydrofuranyl-(2) radical, such as the tetrahydrofuranyl-(2), 4-methyl-tetrahydrofuranyl-(2) or 5-methyl-tetrahydrofuranyl-(2) radical; a tetrahydropyranyl-(2) radical such as the tetrahydropyranyl-(2), 2-methyl-tetrahydropyranyl-(2), 4-methyl-tetrahydropyranyl-(2), 3-chloro-tetrahydropyranyl - (2), 6-phenyl-tetrahydropyranyl-(2) or benz[e]tetrahydropyranyl-(2) radical; a cyclo-oxaheptyl-(2) radical such as the cyclo-oxaheptyl-(2) group or a corresponding thia-cycloalkyl group.

The etherification with the oxa-cycloalkyl-(2) or thia-cycloalkyl-(2) radical may be performed, for example, by reaction with a reactive ester of a 2-hydroxy-oxa- or -thia-cycloalkane containing at least 5 ring members.

Reactive esters of 2-hydroxy-oxa or -thia-cycloalkanes are above all those of strong inorganic or organic acids, more especially of mineral acids, for example, hydrohalic acids such as hydrochloric or hydrobromic acid, or of arylsulfonic acids, for example para-toluenesulfonic acid. Relevant examples are 2-halogenocyclo-oxaalkanes with at least 5 ring atoms, for example 2-chloro-cyclo-oxaalkanes or 2-bromo-cyclooxaalkanes such as 2-chloro-tetrahydrofuran, 2-chlorotetrahydropyran, 2-chloro-cyclo-oxaheptane or the corresponding bromo-compounds.

It is of advantage to perform the reaction in the presence of a condensing agent, more especially of dimethyl formamide which sometimes may also serve as solvent. Other inert solvents may likewise be used as diluents.

In general, the reaction mixture is allowed to stand until the reaction is complete, if necessary with cooling and/or in the dark. The desired final product can then be isolated in known manner.

According to another etherification method the reaction is performed with an at least 5-membered cyclo-oxaalk-2-ene or cyclothiaalk-2-ene in the presence of an acidic condensing agent.

The cyclooxaalk-2-enes and cyclothiaalk-2-enes used as starting materials are advantageously unsubstituted in positions 2 and 3. Particularly suitable starting materials are 5-membered and 6-membered cyclooxaalk-2-enes and cyclothiaalk-2-enes such, for example, as 4:5-dihydrofurans such as 4:5-dihydrofuran or 5-methyl-4:5-dihydrofuran, or 5:6-dihydropyrans, for example 5:6-dihydropyran, 4-methyl-5:6-dihydropyran, 6-methyl-5:6-dihydropyran or 6-chloro-5:6-dihydropyran or the corresponding thia-cycloalkyl compounds.

As acidic condensing agents there are used, for example, strong Lewis acids, such as mineral acids, for example hydrochloric, hydrobromic or sulfuric acid (anhydrous or in the form of a concentrated aqueous solution), phopshoric acids (for example polyphosphoric acids), phosphorus oxychloride, fluoboric acid (as a highly concentrated aqueous solution), boron trifluoride (in the form of an etherate, more especially the diethyl etherate), arylsulfonic acids such as para-toluenesulfonic acid, or acid ion exchange resins, for example sulfonic acid resins, or other Lewis acids suitable for use as condensing agents.

The reaction may be performed in the presence or absence of a diluent, which may be an excess of the liquid cyclooxaalk-2-ene as such. Suitable diluents are, for example, inert solvents such as aromatic hydrocarbons, for example benzene or toluene, ethers, for example diethyl ether, tetrahydrofuran or para-dioxane, lower alkanones, for example acetone or methylethyl ketone, formamides, for example dimethyl formamide, or acetonitrile.

The reaction product is isolated by known methods, advantageously after having neutralized the reaction batch with an alkaline reagent, for example aqueous methanolic or ethanolic ammonia, aqueous alkali metal carbonate, for example sodium or potassium carbonate or bicarbonate, or aqueous alkali metal hydroxide, for example sodium or potassium hydroxide.

The splitting of the lactones is performed, for example, by alkaline hydrolysis or preferably by alcoholysis.

The hydrolysis is preferably carried out in an aqueous organic solvent, for example, in an aqueous alcohol such as a lower alkanol, for example, methanol or ethanol, lower alkanones such as acetone or cyclic ethers such as tetrahydrofuran or dioxane, in the presence of a strong base such as an alkali metal carbonate (sodium or potassium carbonate) or alkali metal hydroxide (sodium or potassium hydroxide). The reaction may be performed at room temperature or with cooling or heating.

The alcoholysis of the 16:18-lactones of the 17α-(oxa- or thia-cycloalkyl-2-oxy)-18β-hydroxy - 20α - yohimbane-16β-carboxylic acids, of their N-oxides or of salts of these compounds is primarily performed by treatment with an alcohol in the presence of a basic catalyst that promotes the alcoholysis, above all an alkali metal alcoholate such as sodium or potassium alcoholate of the alcohol used itself, for example in an inert solvent or if desired in the alcohol used acting as solvent. The reaction may be performed at room temperature or with cooling or heating.

Particularly suitable alcohols are substituted or unsubstituted alkanols such as lower alkanols, for example methanol, ethanol or propanol. These alcohols may be preferably substituted by lower alkoxy groups, di-lower alkyl-amino groups or alkyleneimino groups (which may be interrupted by hetero atoms such as oxygen, sulfur or nitrogen), such as piperidino, pyrrolidino, morpholino, thiamorpholine or piperazino groups.

When the lactones are split hydrolytically, there are obtained compounds that contain in position 16 a free carboxyl group which can be esterified in the usual manner, for example by reaction with a possibly substituted diazoalkane, for example, one that corresponds to the aforementioned alcohols.

The acylation of the 18-hydroxyl group is preferably carried out with a reactive functional derivative of an organic acid, more especially a carboxylic acid, above all with a halide, such as the chloride thereof, or with an anhydride or, if desired, isocyanate, primarily under anhydrous conditions and, if desired, in the presence of an acid-binding condensing agent. Such condensing agents are, for example, organic tertiary bases, more especially tertiary heterocyclic bases such as pyridine, picoline, collidine, lutidine; or tertiary aliphatic amines such as trimethylamine, N:N-dimethyl-N-ethylamine, triethylamine and the like. Carbonates and bicarbonates of alkali or alkaline earth metals are likewise suitable as condensing agents. Liquid organic condensing or esterifying agents may at the same time serve as solvent. Further suitable diluents are, for example, aromatic hydrocarbons such as benzene, toluene or xylene, or aliphatic hydrocarbons such as pentane or hexane. The reaction may be performed with cooling, or at room temperature or—though less advantageously—with heating, if desired in an inert gas, for example nitrogen, and/or with exclusion of moisture.

Particularly suitable derivatives of carboxylic acids are those of aliphatic, araliphatic, heterocyclic or aromatic carboxylic acids or of carbamic acids. Aliphatic carboxylic acids are, for example, fatty acids, for example, lower alkanecarboxylic acids such as acetic, propionic, butyric, pivalic, caproic, isocaproic acid, lower alkanedicarboxylic acids such as adipic acid, lower alkoxyalkanecarboxylic acids such as methoxyacetic acid, lower alkenecarboxylic acids such as crotonic acid, lower alkenedicarboxylic acids such as maleic acid, cycloalkenecarboxylic acids such as cyclohexane-carboxylic or cyclopentane-carboxylic acid. Araliphatic and aromatic carboxylic acids are, for example, arylalkanecarboxylic or arylalkenecarboxylic acids such as phenyl- or naphthyl-lower alkylcarboxylic or -lower alkenylcarboxylic acids, or arylcarboxylic acids such as phenyl-carboxylic or naphthylcarboxylic acids, whose aromatic nuclei may be substituted, for example, by lower alkyls such as methyl, ethyl, propyl or butyl groups, free or substituted hydroxyl or amino groups, azo groups such as phenylazo groups, nitro groups, free or functionally converted carboxyl groups, halogen atoms or trifluoromethyl groups. Substituted hydroxyl groups are more especially lower alkoxy groups such as methoxy, ethoxy, propoxy or butoxy groups, methylenedioxy groups, or acyloxy groups such as lower alkanoyloxy groups such as acetoxy, propionyloxy or butyryloxy groups, or lower alkyl-carbonyloxy groups such as methoxy- or ethoxy-carbonyloxy groups, amino-carbonyloxy groups such as mono- or di-lower alkylamino-carbonyloxy groups, for example, ethylamino-carbonyloxy or phenylamino-carbonyloxy groups. Substituted amino groups are, for example, mono- or di-lower alkylamino groups such as methylamino, ethylamino, dimethylamino or diethylamino groups, or acylamino groups such as lower alkanoylamino groups, for example, acetylamino, propionylamino or butyrylamino groups, or lower alkoxy-carbonylamino groups such as methoxy- or ethoxy-carbonylamino groups. Functionally converted carboxyl groups are, for example, carbo-lower alkoxy groups such as carbomethoxy, carbethoxy, carbopropoxy or carbobutoxy groups, or carbamyl groups.

Examples of such acids are: anisic, veratric, piperonylic, cinnamic, phenylacetic, 3:4-dichlorobenzoic, 3:4:5-trimethoxybenzoic, 3:4:5-trimethoxycinnamic, α-methoxyphenylacetic, diphenylacetic, para-hydroxybenzoic, para-acetylaminobenzoic, para-phenylazobenzoic, 5-amino-2-methoxybenzoic, 5-dimethylamino-2-methoxybenzoic, 3-ethoxy-carbonyloxy-4-methoxybenzoic, 3:4:5-trimethylbenzoic, 3:4:5-triethoxybenzoic, 3:4:5-tri-n-propoxybenzoic, 3:4:5-tri-n-butoxybenzoic, 3:4-dimethoxy-5-hydroxybenzoic, 3:4-dimethoxy-5-carbethoxybenzoic, syringic, O-acetyl-syringic, O-carbomethoxy-syringic, O-carbethoxy-syringic, O - carbopropoxy-syringic, O - carbobutoxy-syringic, O-carboisobutoxy-syringic, 2-carboxy-3:4:5:6-tetrachlorobenzoic, 4-dimethylamino-carbonyloxy-3:5-dimethoxybenzoic, 3:4-dimethoxycinnamic, 3:4:5-trimethoxyphenylacetic, 3:4-diethoxy-carbonyloxy-cinnamic, 1-(ethoxy - carbonyloxy) - 2 - naphthoic or β-naphthoic acid. Heterocyclic carboxylic acids are, for example, furancarboxylic acids such as furan-(2)-carboxylic acid, pyridinecarboxylic acids such as nicotinic acid or pyridine-4-carboxylic acid, quinoline-carboxylic acids such as quinoline-(6)-carboxylic acid.

A group that can be eliminated by hydrogenolysis is advantageously eliminated with hydrogen in the presence of a catalyst containing a metal of group VIII of the Periodic Table, for example, palladium. It is of advantage to perform the elimination in a solvent such as a lower alcohol, for example methanol or ethanol, or in a halogenated lower hydrocarbon, for example chloroform or methylene chloride, if desired at an elevated temperature and under superatmospheric pressure, though as a rule the hydrogenolysis takes place even under atmospheric pressure and at room temperature.

A group that is easy to eliminate by acid hydrolysis is preferably eliminated in the presence of an aqueous acid, for example a dilute mineral acid, for example hydrochloric, hydrobromic or sulfuric acid, a lower alkanecarboxylic acid such as acetic acid or a propionic acid or of an arylsulfonic acid such as toluenesulfonic acid.

The products of the invention have a sedative and/or hypotensive action and/or are valuable intermediates for the manufacture of compounds having a sedative or hypotensive action. Thus, for example, 11-methoxy - 17α - hydroxy - 18β - acyloxy - 3β:20α-yohimbane-16β-carboxylic acid methyl ester may be etherified or esterified in known manner at the 17α-hydroxyl group, whereby there are obtained the sedatively and/or hypotensively active 11 - methoxy - 17α - methoxy-18β-acyloxy - 3β:20α-yohimbane-16β-carboxylic acid methyl esters or the similarly active 11 - methoxy - 17α - acetyloxy - 18β - (3:4:5 - trimethoxybenzoyloxy) - 3β:20α-yohimbane-16β-carboxylic acid methyl ester. A resulting 3α:20α-yohimbane compound can be converted in known manner into the 3β:20α-compound, for example by dehydrogenation and reduction of the Δ³-double bond formed, with zinc in the presence of an acid.

Especially valuable with respect to the above mentioned properties are the compounds of the formula

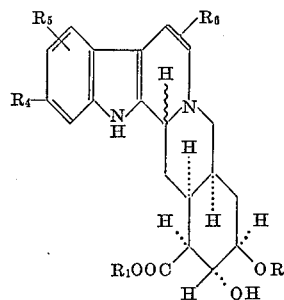

in which R represents an acyl radical, especially the radical of the above mentioned carboxylic acids, $R_1$ an unsubstituted or substituted alkyl radical, especially such a radical as is contained in the above mentioned substituted or unsubstituted alkanols, $R_4$ and $R_5$ each represents a hydrogen atom, a hydroxyl group, lower alkoxy group, lower alkyl group, lower alkylmercapto group, phenyl-lower alkoxy group, amino group, mono- or di-lower alkylamino group or a halogen atom, or $R_4+R_5$ in vicinal positions represent a methylenedioxy group and $R_6$ in one of the positions 5 or 6 represents hydrogen or a lower alkyl radical, their N-oxides and the salts of these compounds, and particularly those compounds of the above formula in which the hydrogen atom in 3-position is in β-position and, R, $R_1$, $R_4$, $R_5$ and $R_6$ have the meanings given above.

These compounds, with the exception of pseudo-reserpine, raunescine and rescidine and their salts, form a special embodiment of the present invention.

The intermediates have likewise a sedative and/or hypotensive action; this is particularly true of the intermediately formed 17α-benzyloxy-, 17α-cyclooxaalkyl-(2)-oxy- and 17α-cyclothiaalkyl-(2)-oxy-18β-acyloxy-3β:20α-yohimbane-16β-carboxylic acid esters, more especially the tetrahydropyranyl ethers. The intermediates and their manufacture are therefore likewise included in the scope of this invention.

Especially valuable intermediates are those which lead to the final products described above as being particularly valuable.

Accordingly, the active compounds of the present invention may be used, for example, either as sedatives or tranquillizers for treating hyperactivity, conditions of tension and excitation or as antihypertensives for the treatment of increased blood pressure.

The new compounds and the starting and intermediate products used may take the form of racemate mixtures, pure racemates or optical antipodes. Racemic intermediates and final products may be resolved, for example, in the following manner: A racemic free base—which may be dissolved, for example, in a lower alkanol such as methanol, ethanol, propanol or isopropanol, or in a halogenated lower aliphatic hydrocarbon such as methylene chloride or chloroform—is reacted with an optically active acid and the resulting salts are separated—for example by virtue of their different solubilities—into the diastereomers from which the antipodes of the new bases can be liberated by treatment with an alkaline agent. More frequently used optically active acids are the D-forms and L-forms of tartaric, di-ortho-toluyltartaric, malic, mandelic, 10-camphorsulfonic or quinic acid.

Racemic compounds having an acidic nature can be separated with the aid of optically active bases, for example, brucine, strychnine, quinine, cinchonine or cinchonidine, similar to the method referred to above.

Optically active forms of the compounds mentioned above can also be obtained with the aid of biochemical methods.

Depending on the reaction conditions and starting materials used the final products of intermediates are obtained in the free form or in the form of their N-oxides and/or of their salts. Thus, for example, there may result basic, neutral acid or mixed salts, possibly also hemi-, mono-, sesqui- or poly-hydrates thereof. The salts of the final products or of the intermediates can be converted in known manner into the free bases. When the free bases are treated with organic or inorganic acids capable of forming therapeutically useful salts, they yield salts. As such acids there may be mentioned for example: hydrohalic, sulfuric, phosphoric acids, nitric, perchloric acid; aliphatic, alicyclic, aromatic or heterocyclic carboxylic or sulfonic acids such as formic, acetic, propionic, oxalic, succinic, glycollic, lactic, malic, tartaric, citric, ascorbic, maleic, hydroxymaleic or pyruvic acid; phenylacetic, benzoic, para-aminobenzoic, anthranilic, para-hydroxybenzoic, salicyclic, or para-aminosalicylic, methanesulfonic, ethanesulfonic, hydroxyethanesulfonic, ethylenesulfonic acid; halogenobenzenesulfonic, toluenesulfonic, naphthalenesulfonic acids or sulfanilic acid; methionine, tryptophan, lysine or arginine.

The salts of the new compound may also be used for purifying the resulting bases by converting the bases into the salts, isolating the latter and liberating the bases from them.

N-oxides of the final products or of the intermediates can be prepared by known methods, for example by treating the new ethers—which are advantageously present in the form of solutions in an inert liquid—with an N-oxidating agent, for example with hydrogen peroxide, ozone, persulfuric acid or more especially an organic peracid such as peracetic, perbenzoic, monoperphthalic or para-toluenepersulfonic acid. The inert liquids used as solvent or diluent in the oxidation are, for example, halogenated lower alkanes such as chloroform, methylene chloride or ethylene chloride, or lower alkanols such as methanol or ethanol. It is of advantage to avoid in the oxidation any excess of oxidant and an elevated temperature to prevent the occurrence of any other kind of oxidative change.

A resulting N-oxide or a salt thereof can be reduced, for example by treatment with hydrogen in the presence of a catalyst containing a metal of group VIII of the Periodic Table, such as Raney nickel, platinum oxide or palladium black, or nascent hydrogen such as is formed when a heavy metal, for example iron, or zinc or tin, acts upon an acid, for example acetic acid.

The final products or intermediates may be isomerized in position 3. Inter alia, for example, a benzyl ether or carbobenzoxy ester obtained intermediately or a resulting final product may be isomerized by known method. The isomerization is preferably carried out by dehydrogenating the $3\alpha$- or $3\beta$-compounds and reducing the $\Delta^3$-yohimbene compound formed to the desired $3\beta$- or $3\alpha$-compound.

Dehydrogenation is performed, for example, by treatment with tertiary butylhypochlorite or palladium carbon under mild conditions, or preferably by treatment with mercury acetate.

The resulting $\Delta$-yohimbene compounds contain the double bond in the 3(14) or in the 3(4) position. In the free base the double bond is in position 3(14), and in a salt in the 3(4) position. The double bond migrates into the last-mentioned position when the base is dissolved in a polar solvent.

Depending on the conditions used for the reduction the resulting compound belongs to the $3\alpha$- or $3\beta$-series.

When the reduction is carried out catalytically, that is to say with hydrogen, in the presence of a catalyst which contains, for example, a metal of group VIII of the Periodic Table such as nickel, palladium or platinum, or with the aid of a light-metal hydride, more especially of a light-metal borohydride such as sodium borohydride, or with nascent hydrogen in an alkaline solution, for example with a metal amalgam in a moist solvent, the $3\alpha$-compounds are formed pre-dominantly. The reaction with a hydride or in an alkaline solution is not suitable for the 16:18-lactones since the lactone grouping is split up.

When the reduction is carried out with nascent hydrogen in the presence of an acid, the $3\beta$-compounds are obtained. It is of advantage to reduce with zinc in the presence of aqueous perchloric acid and/or another acid, for example acetic acid. The reaction may be performed in the presence of a diluent such as an ether, for example tetrahydrofuran or dioxane, or of a lower alkanone, for example acetone.

The resulting isomerized intermediates may be used to carry out the remaining step or steps of the present process.

The invention includes also any modification of the present process in which an intermediate obtainable at any stage of the process is used as starting material and the remaining step or steps is/are carried out, or in which the process is discontinued at any stage thereof, or in which the starting materials are formed in the course of the reaction.

Inter alia, it is especially possible to introduce the ether or ester radical, for example the benzyl radical or the carbobenzoxy radical, at the 17-hydroxyl group at an earlier stage of the total synthesis so as to form directly the intermediates of the invention. In this manner it is possible, for example, to obtain by known methods the 17$\alpha$-benzyloxy-16:18-lactones or 17$\alpha$-carbobenzoxy-16:18-lactones, -18$\beta$-hydroxy-16$\beta$-carboxylic acids or -18$\beta$-hydroxy-16$\beta$-carboxylic acid esters which are then further reacted according to the present invention.

The 16:18-lactones used as starting materials are accessible by hydrolysing a 16$\beta$-carbomethoxy-17$\alpha$-methoxy-18-hydroxy-20$\alpha$-yohimbane compound with hydrobromic acid of 48% strength, reacting the resulting 17$\alpha$:18$\beta$-dihydroxy - 3$\alpha$:20$\alpha$ - yohimbane - 16$\beta$ - carboxylic acid with N:N'-dicyclohexyl-carbodiimide and, if desired, isomerizing the resulting 6:18-lactone of 17$\alpha$:18$\beta$-dihydroxy-3$\alpha$:20$\alpha$-yohimbane-16$\beta$-carboxylic acid with aqueous formic or acetic acid to form the 16:18-lactone of 17$\alpha$:18$\beta$-dihydroxy-3$\beta$:20$\alpha$-yohimbane-16$\beta$-carboxylic acid.

The other starting materials are known or can be prepared by known methods.

The pharmacologically active compounds may be used, for example, in the form of pharmaceutical preparations containing said compounds or their salts in admixture with an organic or inorganic, solid or liquid pharmaceutical excipient suitable for enteral or parenteral administration. Suitable excipients are substances that do not react with the new compounds such, for example, as water, gelatine, lactose, starches, stearyl alcohol, magnesium stearate, talcum, vegetable oils, benzyl alcohols, gums, propylene glycol, polyalkylene glycols, white petroleum jelly, cholesterol or other known medicinal excipients. The pharmaceutical preparations may be, for example, tablets, dragées or capsules, or in liquid form solutions, suspensions or emulsions. They may be sterilized and/or may contain auxiliaries such as preserving, stabilizing, wetting or emulsifying agents, solution promoters, salts for regulating the osmotic pressure or buffers. They may also contain other therapeutically valuable substances. The pharmaceutical preparations are formulated by conventional methods.

The new compounds may also be used in the form of animal feedstuffs or of additives to animal feedstuffs with the use, for example, of the conventional extenders and diluents or feedstuffs respectively.

The following examples illustrate the invention.

*Example 1*

500 mg. of pseudoreserpic acid lactone are dried under a high vacuum and dissolved with heating in 300 ml. of acetone; 10 ml. of 2:3-dihydropyran are added and the mixture is cooled to room temperature. 1.35 ml. of a solution of toluenesulfonic acid in acetone (1.0 g. of acid dissolved in 4.0 ml. of acetone) are then added dropwise and the mixture is left to itself for 1 to 2 days at room temperature. To work up the reaction mixture the acetone is first evaporated under vacuum, then the oily residue taken up in 400 ml. of warm hexane, allowed to cool and the solution is decanted from the resin formed in the flask. The resin which remains in the flask is taken up in 250 ml. of ethyl acetate. The batch is adjusted to pH 8 to 9 by means of aqueous ammonia solution of 10% strength and the phases are separated. The aqueous phase is washed with 2 x 50 ml. of ethyl acetate. All organic phases are successively washed with 2 x 20 ml. of water each. The solution is dried with sodium sulfate and evaporated to dryness under vacuum. The remaining resin is once more taken up in 100 ml. of hexane, whereupon colorless flocks form spontaneously which are filtered off and rinsed with hexane. The purpose of the repeated treatment with hexane is to remove the dihydropyranyl polymer.

The precipitate consists predominantly of the desired tetrahydropyranyl ether. The substance is freed from a brown impurity and a small residue of starting material by dissolving it in 5 to 7 ml. of acetone, and sufficient ether is added to produce a turbidity which settles out after the whole has been kept for several hours at 0° C. and can be filtered off in the form of light brown flocks. The filtrate is evaporated to dryness under vacuum; the residue is dissolved in 1 to 2 ml. of acetone and ether is added to produce a slight turbidity. The batch is allowed to cool and to stand for some time, whereupon a small amount of crystalline starting material forms which is filtered off. The mother liquor contains 17-O-tetrahydropyranyl-pseudoreserpic acid lactone which can be crystallized from aqueous methanol of 80% strength. It forms fine needles melting at 144–148° C.

Further material can be recovered from the mother liquor of the said crystals by freeing the residue from the solvent, dissolving it in a mixture of equal parts by volume of benzene and chloroform and pouring the whole over a column of 30 g. of alumina (neutral; activity II to III according to Brockman). When 100 ml. of this mixture have percolated through the column, elution is performed with 100 ml. of pure chloroform and then 2 to 3 times with 100 ml. of a mixture of 4 parts by volume of chloroform and 1 part by volume of acetone. The latter eluate contains the tetrahydropyranyl ether which can be crystallized as described above.

A solution of 130 mg. of the resulting 17-O-tetrahydropyranyl-pseudoreserpic acid lactone in 16 ml. of methanol is mixed with a solution of 75 mg. of sodium methylate in 16 ml. of methanol, and the whole is kept overnight at room temperature. The solution is then neutralized with dilute methanolic hydrochloric acid and evaporated to dryness under vacuum. The residue is distributed between cholorform and ice-cold 0.5 N-sodium hydroxide solution. After the chloroform phase has been washed with water, dried with sodium sulfate and evaporated under vacuum, it forms a residue which, as revealed by thin-layer chromatographic analysis, consists predominantly of the desired methyl ester; it can be purified in a simple manner by the following abbreviated rapid chromatographic method:

The product is dissolved in anhydrous chloroform stabilized with about 2% of ethanol, the solution is poured over a column of 10 g. of neutral alumina (activity II to III according to Brockman) and the column is eluted with a total of 40 ml. of this solvent, whereby a small amount of a yellow-brownish impurity can be removed. The chloroform is then admixed with 0.5% of methanol, whereupon a band of yellow-green fluorescence dissolves in the upper portion of the column and migrated rapidly. It is completely eluted with 30 to 40 ml. of this mixture. The residue constitutes the pure 17-O-tetrahydropyranyl-pseudoreserpic acid methyl ester which crystallizes in colorless needles from acetone+ether and melts at 226–234° C.

20 mg. of 17-O-tetrahydropyranyl-methyl pseudoreserpate, dried under a high vacuum, in 1 ml. of anhydrous pyridine are mixed with 10 mg. of freshly distilled 3:4:5-trimethoxybenzochloride while being cooled with ice. The mixture is then kept for 1 to 2 days at room temperature. 2 ml. of toluene are then added and the solvent is removed under vacuum. The residue is distributed between ice-cold 0.1 N-sodium hydroxide solution and chloroform. The chloroform solution is washed, dried with sodium sulfate, and evaporated to dryness. The residue is dissolved in a 6:4-mixture of benzene and chloroform and filtered through a layer 1 to 2 cm. thick of alumina (activity II to III, neutral). The column is then rinsed with 50 ml. of the same mixture and the filtrate is evaporated to dryness under vacuum. The residue can be crystallized from aqueous methanol to furnish 17-O-tetrahydropyranyl-pseudoreserpine.

A solution of 20 mg. of 17-O-tetrahydropyranyl-pseudoreserpine in 1 ml. of 2 N-acetic acid is heated for 2 minutes at 100° C., then cooled and extracted with ethylene chloride. The organic phase is treated with sodium carbonate solution and water and the dry residue is crystallized from aqeuous alcohol; it melts at 252–254° C. The product obtained in this manner is found to be identical with authentic pseudoreserpine.

The pseudoreserpic acid lactone used as starting material may be prepared in the following manner:

200 mg. of methylreserpate are dissolved in a 3-litre flask in 1660 g. of hydrobromic acid of 48% strength and heated at the boil for 4 hours under nitrogen. The mixture is then concentrated to syrup consistency under vacuum, taken up in fresh methanol and water and evaporated to dryness under vacuum. This operation is repeated (twice) until the hydrobromic acid has been expelled, and the mixture is then completely dried overnight under a high vacuum. The residue is dissolved in a total of 3 litres of methanol, filtered through diatomaceous earth (Hyflo) and methylated (after having been distributed over 4 flasks) by slowly adding 3 litres of N-ethereal diazomethane solution and keeping the whole for 24 hours.

When all diazomethane has been consumed, the ether is evaporated under diminished pressure and the addition of another 3 litres of ethereal diazomethane solution on each occasion is repeated. When the latter solution has been consumed, the ether is evaporated, then the solution is filtered through diatomaceous earth (Hyflo) and finally concentrated to a volume of 500 ml., upon which crystalline 11-methoxy-17α:18β-dihydroxy-3α:20α-yohimbane-16β-carboxylic acid methyl ester melting at 265° C. is obtained which is isolated by being suctioned off.

36 g. of the resulting methyl ester are suspended in a mixture of 900 ml. of methanol and 270 ml. of aqueous potassium carbonate solution of 40% strength and the whole is caused to dissolve by heating and stirring under nitrogen. The solution is the n refluxed for 1½ hours and allowed to cool overnight, whereupon an abundance of potassium carbonate crystallizes out. The solution is filtered and the crystalline filter cake is rinsed with methanol. While cooling the filtrate with ice it is adjusted with concentrated aqueous and finally with dilute methanolic hydrochloric acid to pH=4 to 5, and then evaporated to dryness under vacuum. The crystalline magna is then converted into potassium chloride by adding hydrochloric acid. The potassium chloride is boiled twice with methanol until it no longer contains any organic material, and the same methanol is used to elute the 11-oxy - 17α:18β-dihydroxy - 3α:20α-yohimbane - 16β-carcarboxylic acid from the evaporation residue. The latter is repeatedly boiled with methanol, then an equal volume of pyridine is added, the whole is allowed to cool and then filtered. The filtrate is evaporated to dryness under vacuum; on being digested with methanol, the residue furnishes the sparingly soluble hydrochloride of 11-methoxy - 17α:18β-dihydroxy - 3α:20α-yohimbane - 16β-carboxylic acid melting at 249-253° C.

6.0 g. of dicyclohexyl-carbodiimide are added to a solution of 8.0 g. of 11-methoxy-17α:18β-dihydroxy-3α:20α-yohimbane-16β-carboxylic acid hydrochloride in 400 ml. of pyridine and the whole is stirred and heated for 3 hours at 100° C. The batch is cooled and the solution evaporated to dryness under vacuum. The residue is agitated for 5 minutes with 120 ml. of ice-cold 2 N-acetic acid, whereupon the lactones passes into solution and the dicyclohexyl-urea remains in crystalline form. It is suctioned off and extracted again in identical manner with 2 x 40 ml. of 2 N-acetic acid, the filter residue being washed each time with 2 N-acetic acid and finally with water. Further acetic acid extracts of the urea prove negative in the Majer test. The acetic acid solutions, which are continuously cooled with ice, are combined. On addition of 6 ml. of concentrated aqueous ammonia (with the pH value of the solution rising from about 2.5 to about 5) smeary impurities are first precipitated. The solution is then decanted from the smeary substances sticking to the wall of the vessel and while thoroughly cooling the solution it is mixed with concentrated ammonia solution (about 30 ml.) until a pH value of 8 to 9 has been established. During this operation the 16:18-lactone of 11-methoxy - 17α:18β-dihydroxy - 3α:20α-yohimbane-16β-carboxylic acid precipitates in yellow flocks which are left to themselves for a short time at 0° C., then suctioned off, thoroughly washed with water and then suction-filtered in air until they are dry. The aforementioned smeary substances are redissolved in 2 N-acetic acid, and by the identical selective precipitation method the residual occluded 16:18-lactone is obtained. The lactone precipitations can be purified by digestion with acetone. By solution in pyridine, evaporation of the solvent under vacuum and taking up the amorphous (or partially crystalline) product in hot acetone the 16:18-lactone of 11-methoxy - 17α:18β - dihydroxy - 3α:20α-yohimbane-16β-carboxylic acid can be purified. It melts at 259-263° C. Optical rotation $[\alpha]_D^{25} = 125° \pm 1°$ (pyridine; c.=1). Its hydrochloride melts at 266°-270° C. with decomposition.

A solution of 5.0 g. of the 16:18-lactone of 11-methoxy - 17α:18β-dihydroxy - 3α:20α-yohimbane-16β-carboxylic acid in 150 ml. of formic acid of 88% strength is stirred and refluxed for 40 minutes under nitrogen. The formic acid is then completely expelled by evaporation with acetone and toluene, and after treatment with acetone there is obtained the 16:18-lactone (which is substantially free from the formyl derivative) of 11-methoxy - 17α:18β-dihydroxy - 3β:20α-yohimbane-16β-carboxylic acid (pseudoreserpic acid lactone) which is recrystallized from methanol to furnish handsome needles melting at 274-276° C. Optical rotation $$[\alpha]_D^{25} = +71.8 \pm 1°$$

(pyridine; c.=0.8). Its hydrochloride melts at 278°-281° C. with decomposition.

Example 2

When 3:4-dimethoxybenzoyl chloride is added to 17-O-tetrahydropyranyl-methyl pseudo-reserpate as described in Example 1 and the tetrahydropyranyl radical is eliminated from the resulting 17-O-tetrahydropyranyl-18-O-(3:4-dimethoxybenzoyl)-pseudoreserpic acid methyl ester with 2 N-acetic acid as described in Example 1, there is obtained 18-O-(3:4 - dimethoxybenzoyl)-pseudoreserpic acid methyl ester. The latter has a melting point of 204-205° C. Kofler heater) and crystallizes in colorless needles which contain half a mol of water of crystallization. The ester has an optical rotation: $[\alpha]_D - 69.8° \pm 1°$ [in chlorform (c.=0.94)]. Its ultraviolet spectrum has pronounced maxima at 223mμ (ε=54400), 264 mμ (ε=18400) and 297 mμ (ε=13200). The infrared spectrum (in methylene chloride) is characterized by a triple band at 2.72; 2.78 and 2.88μ, a double band at 3.40 and 3.51μ and a strong absorption band at 5.84μ which has a pronounced shoulder at 5.80μ. Further strong bands are visible at 6.13; 6.23; 6.61; 6.83; 7.42; 8.18; 8.48; 8.82; 9.75 and 10.25μ.

Example 3

When 3:4-methylenedioxybenzoyl chloride is added to 17-O-tetrahydropyranyl-methyl pseudoreserpate according to the method described in Example 1 and the tetrahydropyranyl ester is eliminated from the resulting 17-O-tetrahydropyranyl - 18-O-(3:4 - methylenedioxybenzoyl)-pseudoreserpic acid methyl ester with 2 N-acetic acid as described in Example 1, there is obtained 18-O-(3:4-methylenedioxybenzoyl)-pseudoreserpic acid methyl ester. The latter has melting point of 206-207° C. (Kofler heater) and crystallizes in the form of fine needles. It has an optical rotation: $[\alpha]_D - 72.3° \pm 1°$ [in chloroform (c.=0.98)]. Its ultraviolet spectrum shows pronounced maxima at 224 mμ (ε=57600), 265 mμ (ε=14800) and 299 mμ (ε=15600). The infrared spectrum (in methylene chloride) is characterized by two double bands at 2.78 and 2.88μ and at 3.43 and 3.50μ. It also displays a strong absorption band at 5.84μ which has a pronounced shoulder at 5.80μ. Further strong bands are visible at 6.13; 6.71; 6.94; 7.61; 8.16; 8.33; 8.65; 9.05; 9.30; 9.62 and 10.27μ.

Example 4

When O-carbethoxysyringoyl chloride is added to 17-O-tetrahydropyranyl-methyl pseudoreserpate according to the method described in Example 1 and the tetrahydropyranyl radical is eliminated from the resulting 17-O-tetrahydropyranyl -18 - O - (O - carbethoxysyringoyl) pseudoreserpic acid methyl ester with 2 N-acetic acid as described in Example 1, there is obtained 18-O-(carbethoxysyringoyl) - pseudoreserpic acid methyl ester. The latter has a melting point of 168-169° C. (Kofler heater) and crystallizes in the form of colorless needles. It has an optical rotation: $[\alpha]_D - 62.0° + 1°$ [in chloroform (c.=0.96)]. Its ultraviolet spectrum displays maxima at 212 mμ (ε=61600), 259 mμ (ε=16400) and 299 mμ (ε=10000). The infrared spectrum (in methylene chloride) is characterized by two double bands at 2.76 and 2.85μ and at 3.38 and 3.48μ. It also displays two very strong absorption bands at 5.64 and 5.78μ. Further strong bands are visible at 6.11/6.20; 6.65; 6.82; 7.44/7.48; 8.28; 8.43; 8.79; 9.49; 9.69 and 10.22μ.

What is claimed is:

1. A member selected from the group consisting of a compound of the formula

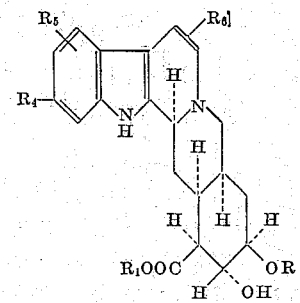

in which R stands for the acyl radical of an acid selected from the group consisting of lower alkanecarboxylic acids, phenyl-lower alkane carboxylic acids, unsubstituted benzoic acid and benzoic acids substituted by a member selected from the group consisting of lower alkyl, hydroxy, lower alkoxy, methylenedioxy, lower alkanoyloxy, amino, mono-lower alkylamino, di-lower alkylamino, lower alkanoylamino, lower alkoxycarbonylamino, nitro, carboxyl, mono-lower alkylaminocarbonyloxy, di-lower alkylaminocarbonyloxy, phenylaminocarbonyloxy, carbo-lower alkoxy, halogen and trifluoromethyl, $R_i$ for a member selected from the group consisting of lower alkyl, lower alkoxy-lower alkyl, di-lower alkylamino-lower alkyl, alkyleneimino-lower alkyl and alkyleneimino-lower alkyl interrupted by a member selected from the group consisting of oxygen, sulfur and nitrogen, said heterocyclic substituents being selected from the group consisting of piperidino, pyrrolidino, morpholino, thiamorpholino and piperazino, $R_4$ and $R_5$ each stands for a member selected from the group consisting of hydrogen, hydroxyl, lower alkoxy, lower alkyl, lower alkylmercapto, phenyl-lower alkoxy, amino, mono-lower alkylamino, di-lower alkylamino and halogen and, when taken together and standing in vicinal positions, methylenedioxy and $R_6$ stands for a member selected from the group consisting of hydrogen and lower alkyl, the N-oxide thereof and the salts of these compounds.

2. A member selected from the group consisting of a compound of the formula

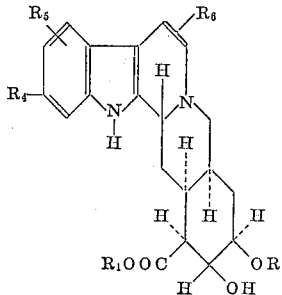

in which R stands for the acyl radical of an acid selected from the group consisting of lower alkanecarboxylic acids, phenyl-lower alkane carboxylic acids, unsubstituted benzoic acid and benzoic acids substituted by a member selected from the group consisting of lower alkyl, hydroxy, lower alkoxy, methylenedioxy, lower alkanoyloxy, amino, mono-lower alkylamino, di-lower alkylamino, lower alkanoylamino, lower alkoxycarbonylamino, nitro, carboxyl, mono-lower alkylaminocarbonyloxy, di-lower alkylaminocarbonyloxy, phenylaminocarbonyloxy, carbolower alkoxy, halogen and trifluoromethyl, $R_1$ for a member selected from the group consisting of lower alkyl, lower alkoxy-lower alkyl, di-lower alkylamino-lower alkyl, alkleneimino-lower alkyl and alkyleneimino-lower alkyl interrupted by a member selected from the group consisting of oxygen, sulfur and nitrogen, said heterocyclic substituents being selected from the group consisting of piperidino, pyrrolidino, morpholino, thiamorpholino and piperazino, $R_4$ and $R_5$ each stands for a member selected from the group consisting of hydrogen, hydroxyl, lower alkoxy, lower alkyl, lower alkylmercapto, phenyl-lower alkoxy, amino, mono-lower alkylamino, di-lower alkylamino and halogen, and, when taken together and standing in vicinal positions, methylenedioxy and $R_6$ stands for a member selected from the group consisting of hydrogen and lower alkyl, the N-oxide thereof and the salts of these compounds with the exception of raunescine, rescidine and pseudoreserpine and their salts.

3. A member selected from the group consisting of a compound of the formula

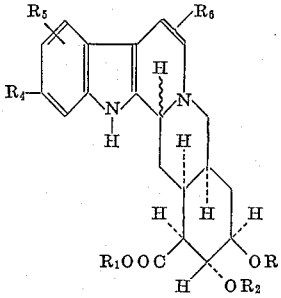

in which R stands for the acyl radical of an acid selected from the group consisting of lower alkanecarboxylic acids, phenyl-lower alkane carboxylic acids, unsubstituted benzoic acid and benzoic acids substituted by a member selected from the group consisting of lower alkyl, hydroxy, lower alkoxy, methylenedioxy, lower alkanoyloxy, amino, mono-lower alkylamino, di-lower alkylamino, lower alkanoylamino, lower alkoxycarbonylamino, nitro, carboxyl, mono-lower alkylaminocarbonyloxy, di-lower alkylaminocarbonyloxy, phenylaminocarbonyloxy, carbolower alkoxy, halogen and trifluoromethyl, $R_2$ for a member selected from the group consisting of benzyl, carbobenzoxy, 5 to 7-ring-member cyclooxaalkyl-(2) and 5 to 7-ring-member cyclothiaalkyl-(2) and each of said cyclooxaalkyl and cyclothiaalkyl substituents substituted by a member selected from the group consisting of lower alkyl, phenyl, phenyl-lower alkyl and halogen, $R_1$ for a member selected from the group consisting of lower alkyl, lower alkoxy-lower alkyl, di-lower alkylamino-lower alkyl, alkyleneimino-lower alkyl and alkyleneimino-lower alkyl interupted by a member selected from the group consisting of oxygen, sulfur and nitrogen, said heterocyclic substituents being selected from the group consisting of piperidino, pyrrolidino, morpholino, thiamorpholino and piperazino, $R_4$ and $R_5$ each stands for a member selected from the group consisting of hydrogen, hydroxyl, lower alkoxy, lower alkyl, lower alkylmercapto, phenyl-lower alkoxy, amino, mono-lower alkylamino, di-lower alkylamino and halogen, and, when taken together and standing in vicinal positions, methylenedioxy and $R_6$ stands for a member selected from the group consisting of hydrogen and lower alkyl, the N-oxides thereof and the salts of these compounds.

4. 17-O-tetrahydropyranyl-pseudoreserpic acid lactone.
5. 17-O-tetrahydropyranyl-pseudoreserpic acid methyl ester.
6. 17-O-tetrahydropyranylpseudoreserpine.
7. 17 - O - tetrahydropyranyl - 18 - O - (3:4 - dimethoxybenzoyl)-pseudoreserpic acid methyl ester.
8. 17 - O - tetrahydropyranyl - 18 - O -(3:4 - methylenedioxybenzoyl)-pseudoreserpic acid methyl ester.
9. 17 - O - tetrahydropyranyl - 18 - O - (O - carbethoxysyringoyl)-pseudoreserpic acid methyl ester.
10. 18 - O - (3:4 - dimethoxybenzoyl) - pseudoreserpic acid methyl ester.
11. 18 - O - (3:4 - methylenedioxybenzoyl) - pseudoreserpic acid methyl ester.
12. 18 - O - (O - carbethoxysyringoyl) - pseudoreserpic acid methyl ester.

References Cited by the Examiner
UNITED STATES PATENTS

| | | | |
|---|---|---|---|
| 2,857,385 | 10/1958 | Kuehne | 260—286 |
| 2,995,556 | 8/1961 | Lucas | 260—287 |
| 3,031,453 | 4/1962 | Lucas | 260—287 |

OTHER REFERENCES

Daubert et al., Jour. Amer. Chem. Soc., vol. 61 (1939), pages 3328–30.
Goldsmith, Chem. Reviews, vol. 33 (1943), pages 280–1.
Klohs et al., Jour. Amer. Chem. Soc., vol. 79 (1957), pages 3763–66.
McCloskey, Adv. in Carbohydrate Chem., vol. 12, (1957), pages 137–42, 148–50.
Parham et al., Jour. Amer. Chem. Soc., vol. 70 (1948) pages 4187–9.
Parham et al., Jour. Amer. Chem. Soc., vol. 76, (1954), pages 4962–5.
Popelak et al., Naturwiss., vol. 48 (1961), pages 73 and 74.
Van Tamelen et al., Jour. Amer. Chem. Soc., vol. 79 (1957), pages 5256–62.

WALTER A. MODANCE, *Primary Examiner.*
JOHN D. RANDOLPH, JAMES A. PATTEN,
*Assistant Examiners.*